March 17, 1970 C. P. GERRARD 3,501,751

HIGH SPEED CORE MEMORY WITH LOW LEVEL SWITCHES FOR SENSE WINDINGS

Filed Dec. 6, 1965

INVENTOR.
CHARLES P. GERRARD

BY Christie, Parker & Hale
ATTORNEYS 3,501,751
Patented Mar. 17, 1970

3,501,751

HIGH SPEED CORE MEMORY WITH LOW LEVEL SWITCHES FOR SENSE WINDINGS

Charles P. Gerrard, Pasadena, Calif., assignor to Burroughs Corporation, Detroit, Mich., a corporation of Michigan Filed Dec. 6, 1965, Ser. No. 511,738
Int. Cl. G11b *5/00;* H03k *17/00*
U.S. Cl. 340—174 3 Claims

ABSTRACT OF THE DISCLOSURE

There is described a coincidence core memory in which a plurality of output sense windings are selectively gated by low level switching to a common output amplifier, the gating being controlled by an address register which stores part of the memory address.

This invention relates to core memories and, more particularly, is concerned with a memory system using low level switching for switching multiple sense windings to a common output amplifier.

In coincident core memories, read-out of stored information is generally accomplished by means of a sense line which passes through all the cores in a memory plane. Half select drive currents are applied to one of a plurality of rows in one of a plurality of columns in the memory plane, the two half select currents combining on the one core intersected by the row and column drives lines to switch flux in the selected core. The changing flux in the selected core produces an output signal on the sense line. Because the cores are not ideally "square loop" in their magnetic properties, some flux is switched in all of the cores in a selected row and a selected column of the memory plane, resulting in noise on the sense line. Thus the number of cores in a memory plane which can be linked by a single sense line is limited by this noise factor. Moreover, the sense line acts as a delay line with the cores providing inductance. Therefore the more cores that are linked by the sense line, the greater the delay and therefore the slower the speed of operation of the memory.

For these reasons, it has become necessary to divide the memory plane up into a plurality of sections, for example, into four quadrants, each section having its own sense line. It has been the practice in the past to combine the signals from the several sense lines by a summing network, which may comprise pre-amplifiers for each of the sense lines sharing a common output load. Two problems encountered in such an arrangement are that the noise on the non-addressed sense wires is added to the wanted sense signals and large transients which appear on the sense lines during the "Write" portion of the memory cycle may saturate the amplifiers in the sense lines, limiting the cycling rate of the memory.

The present invention provides an improved coincident core memory in which each core plane is divided into two or more sections each with its own sense winding. Each of these sense windings is connected across the input of a common differential amplifier by an associated low level switch. The low level switches each include a pair of field effect transistors. The selected low level switch is operated by the "Read" pulse so that the sense lines are isolated from the output amplifier except during the "Read" operation.

Figure 1:
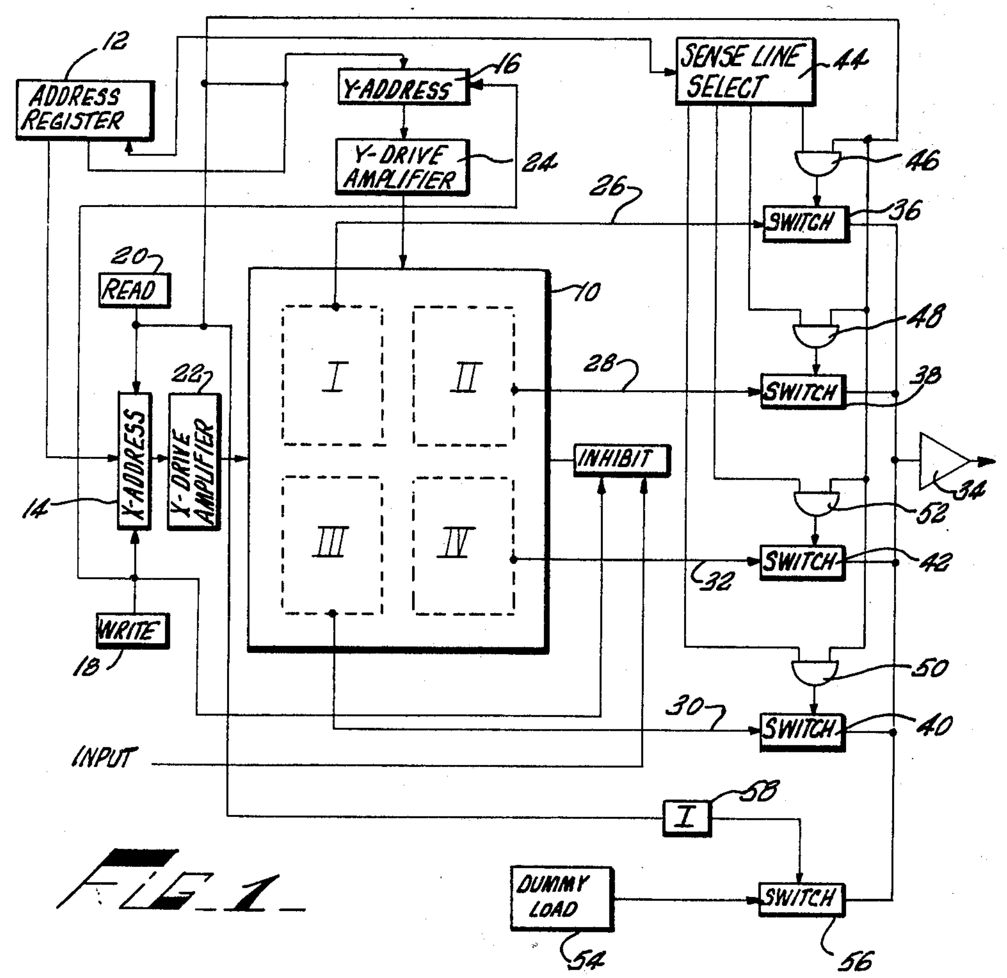
Figure 2:
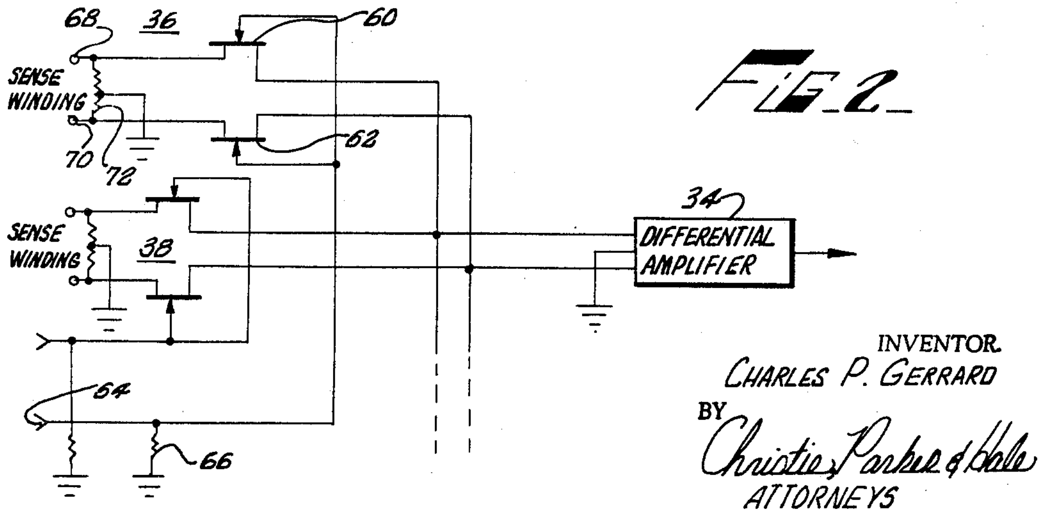

For a more complete understanding of the invention, reference should be made to the accompanying drawings wherein:

FIGURE 1 is a block schematic diagram of a coincidence core memory incorporating the features of the present invention; and FIGURE 2 is a schematic circuit diagram of the low level switches.

Referring to FIGURE 1 in detail, the numeral 10 indicates generally a single plane of a coincident core memory. The construction and operation of coincident core memories is well known and will not be described herein in detail. Such memories are described in more detail in the book "Digital Computer Components and Circuits" by R. K. Richards, D. Van Nostrand Company, 1957, Chapter 8. The input to the core memory plane consists of a plurality of X drive lines, and Y drive lines arranged in rows and columns forming an array. One of the X drive lines and one of the Y drive lines is selected by address information which is stored in an address register 12. The address information is applied to an X address selection matrix 14 while the Y address information is applied to a Y address selection matrix 16. The X address selection matrix 14 selects one of the drive lines and in response to a "Write" pulse from a "Write" pulse source 18, or a "Read" pulse from a "Read" pulse source 20, pulses a selected one of the X and Y drive lines. X drive amplifiers 22 and Y drive amplifiers 24 provide the required half-select current on the drive lines.

Four sense lines, indicated at 26, 28, 30 and 32, are provided, the four sense lines being arranged in four quadrants of the memory plane, as indicated by I through IV. Each sense line links all of the cores in the associated quadrant of the memory plane 10. The address information in the register 12 includes information as to which quadrant the selected core is located in.

According to the present invention, each of the sense windings in the four quadrants is connected by its own level switch to an output amplifier 34. The low level switches are indicated at 36, 38, 40 and 42 respectively. These switches are normally open, only one of these switches being closed by the "Read" pulse from the source 20. Operation of one of the switches is accomplished by a sense line select circuit 44 which decodes the information in the address register 12 and energizes one of four output lines depending upon which sense quadrant is identified by the address in the register 12. Each of these four lines is applied to one of four logical "and" gates, indicated at 46, 48, 50 and 52, together with the output of the "Read" pulse source 20. Thus the "Read" pulse is applied to one of the switches for momentarily closing the switch to connect the sense line of the associated quadrant of the memory plane to the input of the amplifier 34.

Since all four low level sense line switches are normally open, in order that the input to the amplifier 34 will not be floating, a dummy input load 54 is normally coupled through a low level switch 56 to the input of the amplifier 34. The "Read" pulse source 20 is connected to the switch 56 through an inverter or negating circuit 58 so that the switch 56 is normally closed except when the "Read" pulse from the source 20 closes one of the low level switches connected to the sense lines of the memory plane.

Referring to FIGURE 2, two low level switches are shown in detail. Each low level switch includes a pair of field effect transistors, indicated at 60 and 62 for the switch 36. The gate electrodes of the two field effect transistors are connected together to an input control terminal 64. The gate electrodes of the field effect transistor are normally tied to ground through a large resistor 66. The source electrodes of the field effect transistors 60 and 62 are connected to a pair of input terminals 68 and 70 across which the sense winding of one quadrant of the memory core plane is connected. The source electrodes are also tied to ground through a large center-tapped resistor 72. The drain electrodes of the field effect transistors 60 and 62 are in turn directly connected to the input terminals of the differential amplifier 34.

The low level switch 38 similarly utilizes a pair of field effect transistors to connect the sense winding across the input terminals of the differential amplifier 34.

In operation, when a positive-going pulse is applied to the input control terminal, the field effect transistors of the associated switch are changed to a "closed" or low resistance state. The field effect transistors provide an effective low level switch since they are extremely fast, provide a high input impedance for the control circuit, and introduce no offset voltage due to junction potentials.

What is claimed is:

1. In a magnetic core memory having a plurality of memory planes, each plane including an array of annular magnetic cores arranged in a matrix, two groups of drive windings arranged with one winding of each group passing through each core of a plane with each core having only one winding in common with any of the other cores in the plane, an address register, means responsive to the contents of said register for selectively activating simultaneously any one of the windings in the first group and any one of the windings in said second group, the improvement comprising: a plurality of separate sense windings, each of the sense windings linking a separate group of cores within one plane, a common output amplifier, a plurality of low level high speed switches, respective ones of said switches connecting each of the sense windings of one memory plane to the input of said common amplifier, and means responsive to the contents of said address register to selectively close the one of said switches associated with the sense winding linking the same core as the two selected windings of said first and second groups.

2. Apparatus as defined in claim 1 wherein each low level switch includes a pair of field effect transistors, the two ends of the associated sensing windings being respectively connected by the two transistors to the input terminals of the output amplifier, and said selective means includes means for simultaneously biasing both transistors of a particular switch to a conductive state.

3. Apparatus as defined in claim 1 further including means including a low level switch for coupling a matching load across the input to the amplifier, said selective means including means for opening said last-named switch whenever one of the first-mentioned group of low level switches is closed.

References Cited

UNITED STATES PATENTS

| | | | |
|---|---|---|---|
| 3,193,807 | 7/1965 | Vinal | 340—174 |
| 3,231,876 | 1/1966 | Vinal | 340—174 |
| 3,317,850 | 5/1967 | Hilbiber | 307—304 |
| 3,401,351 | 9/1968 | Ellestad | 330—69 |
| 3,015,808 | 1/1962 | De Troye | 340—174 |
| 3,161,860 | 12/1964 | Grooteboer | 340—174 |

OTHER REFERENCES

IBM Technical Bulletin, Council et al., vol. 6, No. 4, September 1963, pp. 55–56.

STANLEY M. URYNOWICZ, Jr., Primary Examiner

K. E. KROSIN, Assistant Examiner

U.S. Cl. X.R.

307—242, 251